United States Patent [19]
Kelley

[11] Patent Number: 5,516,501
[45] Date of Patent: May 14, 1996

[54] PROCESS FOR THE PREPARATION OF AQUEOUS SOLUTIONS OF BROMINE BASED DISINFECTANTS

[75] Inventor: Joseph M. Kelley, Westfield, N.J.

[73] Assignee: International Dioxcide, Clark, N.J.

[21] Appl. No.: 411,410

[22] Filed: Mar. 28, 1995

Related U.S. Application Data

[63] Continuation of Ser. No. 76,278, Jun. 11, 1993, abandoned, which is a continuation of Ser. No. 878,773, May 5, 1992, abandoned.

[51] Int. Cl.$^6$ .................................................. C01B 11/20
[52] U.S. Cl. ........................................... 423/473; 210/754
[58] Field of Search ............................ 423/473; 210/754, 210/756, 764

[56] References Cited

U.S. PATENT DOCUMENTS

| | | | |
|---|---|---|---|
| 2,443,429 | 6/1948 | Marks | 210/753 |
| 3,152,073 | 10/1964 | Morton | 210/754 |
| 3,975,271 | 8/1976 | Saunier et al. | 210/753 |
| 4,019,983 | 4/1977 | Mandt | 210/574 |
| 4,219,419 | 8/1980 | Sweeny | 210/754 |
| 4,451,376 | 5/1984 | Sharp | 210/756 |
| 4,643,835 | 2/1987 | Koeplin-Gall et al. | 210/754 |
| 4,680,136 | 7/1987 | Bernhard | 423/515 |
| 4,759,852 | 7/1988 | Trulear | 210/754 |
| 4,818,413 | 4/1989 | Hover et al. | 210/754 |
| 5,009,875 | 4/1991 | Kelley et al. | 423/477 |
| 5,094,833 | 3/1992 | Ko et al. | 425/515 |
| 5,141,754 | 8/1992 | Ekis, Jr. et al. | 210/754 |

OTHER PUBLICATIONS

McCabe et al, "Unit Operations of Chemcial Engineering", 3rd ed. 1976, pp. 244–251.
Perry et al, "Chemical Engineers' Handbook", Fifth ed. TP 155 p. 4 1973.

*Primary Examiner*—Gary P. Straub
*Assistant Examiner*—N. M. Nguyen
*Attorney, Agent, or Firm*—Rogers & Wells

[57] ABSTRACT

Processes for preparing a relatively concentrated aqueous solution of about 700–3000 ppm hyprobromous acid are provided. Hypochlorous acid solutions are prepared by either reacting chlorine gas with water or sodium hypochlorite with an acid. The resulting hypochlorous acid is then reacted with an alkali metal or alkaline earth bromide in order to form the hypobromous acid. Critical parameters are pH, Br/Cl mole ratio, and chlorine concentration. Under optimum conditions, substantially 100% conversion of bromide to hypobromous acid can be attained.

19 Claims, 4 Drawing Sheets

PROCESS FOR THE PREPARATION OF AQUEOUS SOLUTIONS OF BROMINE BASED DISINFECTANTS

This is a continuation of application Ser. No. 08/076,278, filed Jun. 11, 1993, now abandoned, entitled PROCESS FOR THE PREPARATION OF AQUEOUS SOLUTIONS OF BROMINE BASED DISINFECTANTS which is a continuation of Ser. No. 07/878,773 filed May 5, 1992, now abandoned.

BACKGROUND OF THE INVENTION

1. Field of the Invention

The present invention relates to the production of concentrated aqueous solutions of bromine-based disinfectants. More particularly, the present invention relates to a process for the generation of hypobromous acid.

2. Description of the Prior Art

Industrial process waters, such as cooling tower water, paper plant water, and the like are often contaminated with undesirable microorganisms. Waste waters from sewage plants constitute another source of contaminants such as coliform, viruses, and other organisms which must be eliminated before discharge.

In cases where treated water is discharged into rivers and streams, it is important that low residual oxidant be maintained and that any disinfectant discharged be of low toxicity.

Chlorine has long been employed in the disinfection of drinking water, process water, cooling water, waste water, and the like. However, the use of chlorine has generated problems in some of the above uses. For example, the use of chlorine in the disinfection of drinking water containing organic contaminants has led to the formation of high levels of trihalomethanes, which are carcinogenic. The use of chlorine in process and cooling water has led to excessive corrosion of equipment. In addition, chlorine residuals in waste water lead to destruction of aquatic life when the waste water is discharged into streams or rivers.

Substitution of bromine-based disinfectants, such as hypobromous acid (HOBr), for chlorine has the following advantages:

(i) hypobromous acid it is a more powerful disinfectant than chlorine, allowing the maintenance of much lower residuals to attain the same kill;

(ii) hypobromous acid decomposes into harmless products much more rapidly than chlorine-based disinfectants such as hypochlorous acid, giving a much lower concentration of toxic materials at discharge into marine waterways;

(iii) hypobromous acid is much less toxic to aquatic life (especially the initial species in the aquatic food chain) than the same concentration of hypochlorous acid;

(iv) the ability to use lower residual concentrations of hypobromous acid, leads to lower concentrations of harmful by-products such as trihalomethanes; and (v) lower residual concentrations of hypobromous acid, plus its rapid rate of decomposition to non-toxic products, reduces the cost of total dehalogenation (before discharge) to insignificance.

Several paths of decomposition of hypobromous acid are possible as shown in the following reactions:

$$2HOBr \rightarrow 2H^+ + 2Br^- + O_2 \uparrow$$

$$3HOBr \rightarrow BrO_3^- + 2Br^- + 3H^+$$

$$5HOBr \rightarrow H^+ + BrO_3^- + 2Br_2 + 2H_2O$$

There is much less corrosion with bromine-based disinfectants, such as hypobromous acid, than with chlorine. This is true for two reasons. First, the residual concentration of hypobromous acid is much lower than chlorine due to its higher potency against organisms and its rapid decomposition rate. Secondly, it has a lower oxidation potential than chlorine which has 2–3 times more corrosive effect than bromine-based disinfectants.

Various methods have been employed to introduce bromine-based disinfectant systems into aqueous solutions for the purpose of preventing the growth of harmful and offensive microorganisms.

Among these are various N-brominated organic compounds, in which the bromine atom is loosely bound and capable of rapid reaction to give hypobromous acid when added to water. An example of this type of compound is bromochlorodimethylhydantoin (BCDMH) which, when added to water, undergoes hydrolysis to give hypobromous acid and hypochlorous acid by the following reaction:

$$C_5H_6BrClN_2O_2 + 2H_2O \rightarrow C_5H_6N_2O_2 + HOBr + HOCl$$

The hypohalous acids (HOBr and HOCl) thus generated are powerful disinfectants and will kill any organisms present and prevent the growth of any objectionable microbiological life forms. However, this type of brominated organic compound has several disadvantages. The cost is very high and a dimethylhydantoin by-product is produced. The presence of hypochlorous acid in the solution poses problems on discharge into streams or rivers due to its stability and toxicity to marine life.

Another method of generating hypobromous acid is by the hydrolysis of bromine chloride (BrCl) according to the following reaction:

$$BrCl + H_2O \rightarrow HOBr + HCl$$

Bromine chloride is a liquid under pressure. When used in the same type of cylinders used for chlorine, it requires a specially designed, expensive liquid feeder to proportion the bromine chloride into water. It also creates safety concerns due to the necessity of storing large quantities of gas on-site.

Yet another method of generating hypobromous acid is to chlorinate water and then to pump a solution of sodium bromide (NaBr) into water containing hypochlorous acid (HOCl). The following equations illustrate this method:

$$Cl_2 + H_2O \rightarrow HOCl + HCl$$

$$HOCl + NaBr \rightarrow HOBr + HCl$$

The disadvantage in using this method is that the water contacts chlorine before the hypobromous acid is formed and chlorinated by-products may be formed in waste the water. Also, in high chlorine demand water, the chlorine may not be available to oxidize the bromide ion (Br—) to hypobromite ion (OBr—) due to prior reaction. In addition, there is no control of reaction conditions to assure optimum conversion of the bromide to hypobromous acid. The concentration, pH and bromide/chlorine (Br/Cl) mole ratio are all important in the above reactions. It is almost impossible to control all of these variables using a pump to add the bromide ion to the chlorinated water.

U.S. Pat. No. 4,451,376 (to J. D. Sharp) indicates that it is not efficient to prepare hyprobromous acid directly in a biologically contaminated water system due to the loss of hypochlorous acid and the resulting poor conversion of bromide ion to hyprobromous acid. It also points out that the hyprobromous acid should be prepared as a treating solution which then contacts the unwanted microorganism. It further points out the fact that if sodium hypochlorite or chlorine is combined with a bromide salt in a mixing tank in an effort to produce hypobromous acid, the hypobromous acid is not stable at concentrated levels and decomposes to bromine, bromate and bromite.

Thus, there is no method for generating hypobromous acid wherein all of the variables can be controlled by a single apparatus and where the yield of hypobromous acid approaches 100%.

Accordingly, it is an object of the present invention to provide novel processes for the generation of relatively concentrated solutions of hypobromous acid. Another object of the present invention is to provide a process which gives high yields of relatively concentrated hypobromous acid in water from non-hazardous reactants.

These and other objects, as well as the scope, nature and utilization of the invention will become apparent to those skilled in the art from the following description, the drawing, and the appended claims.

SUMMARY OF THE INVENTION

The above problem is eliminated by the present processes. In the preferred process the compounds separately react in a relatively dilute water stream. In an alternate process the compounds are prereacted and the reaction mixture is introduced into the water stream. Preferably, the processes are carried out in an apparatus, hereafter referred to as a generator, which has an eductor. The residence time in the generator is very low. About 2000 ppm hypobromous acid are produced, which is subsequently diluted to use levels of about 0.1 to 3 ppm. The synthesis is completed under optimum conditions within seconds and the resulting hypobromous acid is further diluted immediately, thus minimizing decomposition reactions. In the process of U.S. Pat. No. 4,451,376, it is necessary to add a dispersing agent to the bromide salt before mixing with the chlorine donor to prevent these unwanted decomposition reactions in the concentrated hypobromous acid.

The preferred process for the preparing an aqueous solution of hypobromous acid comprises the steps of:

(a) separately feeding compounds, which when reacted together yield hypobromous acid, via separate feed lines into a water stream, followed by complete mixing of the compounds;

(b) allowing the compounds to react in the water stream to yield hypobromous acid and thereby form the aqueous hypobromous acid solution, and;

(c) monitoring the pH of the formed aqueous hypobromous acid solution using a pH meter provided downstream of the reaction between the compounds which yield the hypobromous acid.

In one embodiment of this preferred process, the compounds which are separately fed into the water stream are gaseous chlorine and an aqueous solution of an alkali metal bromide or an alkaline earth metal bromide.

In the second embodiment of the preferred process, the compounds are also gaseous chlorine and an alkali metal bromide or an alkaline earth metal bromide. In this embodiment the chlorine gas is pumped into the water stream first and then the aqueous solution of the alkali metal or alkaline earth bromide is pumped into the hypochlorous acid solution resulting from the reaction of the chlorine and water.

An apparatus capable of carrying out the above embodiments is marketed by International Dioxcide, Inc. under the trademark of OXYCHLOR II™ and is described in U.S. Pat. No. 5,009,875 (issued Apr. 23, 1991 to J. M. Kelley et al.), the disclosure of which is incorporated herein by reference. One skilled in the art would recognize that the apparatus described in the '875 patent can be modified to allow the water to be chlorinated first.

In a third embodiment of the preferred process, an aqueous mixture of alkali metal hypochlorite (e.g., sodium hypochlorite) and an acid (preferably hydrochloric acid) are substituted for the chlorine gas. This is done when it is desired to eliminate the storage of chlorine gas. In this embodiment the sodium hypochlorite (NaOCl) and hydrochloric acid (HCl) are premixed, before addition to the water stream, to give hypochlorous acid according to the following equation:

NaOCl+HCl→HOCl+NaCl

An excess of the acid may be added to the water solution to maintain the pH at the optimum level.

An apparatus capable of carrying out the above embodiment is the OXYCHLOR III™ generator marketed by International Dioxcide, Inc.

An alternate process for preparing an aqueous solution of hypobromous acid comprises the steps of:

(a) prereacting compounds which when reacted together yield hypobromous acid;

(b) feeding the reaction mixture into a water stream to form the aqueous hypobromous acid solution; and (c) monitoring the pH of the hypobromous acid solution formed using a pH meter provided downstream of where the reaction between the compounds which form the hypobromous acid occurs.

The compounds used in the above process are gaseous chlorine and an alkali metal bromide or an alkaline earth metal bromide. The preferred alkali metal bromide is sodium bromide. Preferably the reaction mixture is fed into an eductor through which the water stream flows.

One skilled in the art will recognize that the apparatus described in the '875 patent can be repiped to allow the compounds to prereact before introduction into the water stream.

Optionally, a purge cycle may be included in the above processes in order to flush out any residual chemicals with water when the apparatus is shut down.

The aqueous hypobromous acid solution resulting from these process is added to the stream of water to be disinfected at a rate sufficient to give the desired final concentration of hypobromous acid in the water to be treated, usually in the range of 0.1 to 3 ppm.

DESCRIPTION OF THE DRAWINGS

FIG. 1 schematically depicts an apparatus useful in the practice of the present invention. The apparatus described is useful without modification for the first embodiment of the preferred process. It can be modified as previously discussed for use with the other embodiments and alternate process.

DETAILED DESCRIPTION OF THE PREFERRED EMBODIMENTS

In the preferred process of the present invention, compounds, which when reacted together produce hypobromous acid, are fed via separate feed lines into a water stream, preferably into an eductor through which the water stream is flowing. In an alternate process, a reaction mixture containing the prereacted compounds is fed into a water stream, preferably into an eductor through which water stream is flowing.

Preferred starting compounds are chlorine gas and a concentrated solution of an alkali metal bromide or alkaline earth metal bromide, preferably sodium bromide, dissolved in water. The highest possible concentration of sodium bromide in the aqueous solution is desirable because it allows the highest production of hypobromous acid. The sodium bromide concentration is preferably 40 weight % or greater, but concentrations of 20–40 wt. % are suitable. The chlorine gas is dissolved in and/or reacts with water to produce hypochlorous acid which reacts almost instantaneously with the bromide ion. The reactions which result in the formation of hypobromous acid are practically instantaneous and are as follows:

$$Cl_2 + H_2O \rightarrow HOCl + HCl \quad (1)$$

$$HOCl + NaBr \rightarrow HOBr + NaCl \quad (2)$$

In general, it is preferable to dilute the compounds in a water stream rather than to allow pure chlorine gas to contact the sodium bromide solution because of the following side reaction between the sodium bromide and chlorine gas:

$$2NaBr + Cl_2 \rightarrow Br_2 + 2NaCl$$

In this side reaction some of the bromide ion will be converted to free bromine. This is undesirable since the reaction of bromine with water is slower than the reaction of chlorine with water, although it will eventually give hypobromous acid by the following equation:

$$Br_2 + H_2O \rightarrow HOBr + HBr$$

Alternatively, it is possible to use hydrochloric acid, sodium hypochlorite, and sodium bromide as reactants to achieve the same result without using gaseous chlorine.

In the preferred process, once the compounds are introduced into the water stream and diluted, they are mixed by passage through an in-line static mixer. Although the reactions leading to the formation of hypobromous acid are instantaneous, preferably a reaction chamber or line is provided so that sufficient time is provided for complete reaction to occur.

In the preferred process, shutoff valves are provided in the feed lines. When closed, the shutoff valves restrict any further flow of the compounds through the feed lines. In the apparatus marketed by International Dioxcide, Inc., these shutoff valves can be actuated by a supply monitoring system if any one of the compounds is depleted, thus ceasing the generation of hypobromous acid and shutting the unit down.

The monitoring by the pH meter is extremely important to the objectives of this invention. The use of this pH meter permits the generation of hypobromous acid at high conversion under optimal conditions. Incomplete reaction of the sodium bromide or free chlorine and the presence of sodium bromide or free chlorine in the product is extremely undesirable. The optimum pH for the hypobromous acid solution is from about 2.3–2.8. This pH will give high conversions of the sodium bromide to hypobromous acid. Control points on the pH meter can be set to shut off the flow of compounds or to signal an alarm when the pH is outside of the set limits.

Preferably, the feed lines are under vacuum. This is an added safety feature to prevent escape of the compounds during operation or shutdown.

Figure 1:
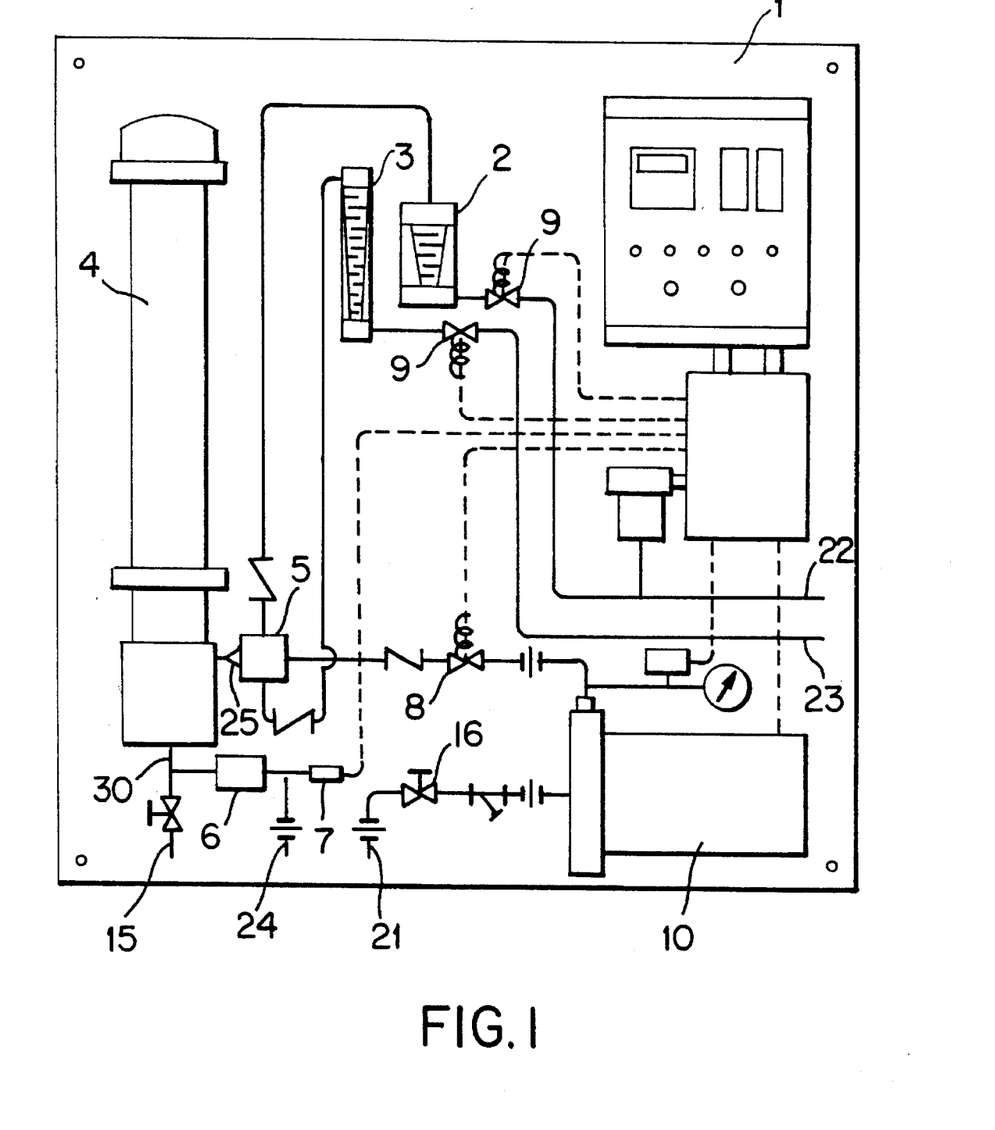

Turning now to the drawing of FIG. 1, there is schematically depicted an apparatus for use in the preferred process which utilizes chlorine gas and an aqueous solution of sodium bromide as the separately fed reactants. All of the reactants required for the process can be mounted on a panel 1, which panel can be wall mounted if desired. In the system depicted, a supply means for water can be connected to inlet means 21. The amount of water provided to the reaction area can be controlled by valve 16. The pressure of the normal water supply is generally around 40 to 60 psig, but this is not critical. Lower pressures can be used as a booster pump 10 will compensate therefore. The flow of water cannot only be controlled by supply valve 16, but also by solenoid valve 8.

Gaseous chlorine is provided, preferably under vacuum, by feed line 22, with the supply rate being adjusted by chlorine meter 2. The aqueous sodium bromide solution is supplied by feed line 23, with the supply rate being adjusted by meter 3. Both of the feed lines contain solenoid valves 9, which can control the flow of reactants through the feed line.

The aqueous sodium bromide solution and chlorine gas are fed by their respective feed lines, preferably under vacuum, into eductor 5, through which the water stream flows. The chemical reactants and the water are then passed through a static mixer 25 to insure complete mixing of the compounds and into reactor column 4, wherein the reaction of the chlorine gas and the sodium bromide to form hypobromous acid takes place. The reactor column 4 preferably provides sufficient retention time to provide high yields of hypobromous acid. The resultant hypobromous acid solution is then transferred via line 30 from the reactor column to exit 24, from which the hypobromous acid solution can be passed to a holding tank or to its ultimate end use, for example, the treatment of waste water discharge in a sewage plant. Before exiting, however, the hypobromous acid solution can be viewed through sight glass 6. The hypobromous acid solution is also monitored by pH meter 7. The optimal pH of the product solution is between 2.3 and 2.8. A pH within this range indicates the generation process is proceeding at the optimum level. If a further analysis is to be performed, the hypobromous acid solution can be drawn from tap 15 provided at the base of reactor column 4.

The preferred source of bromide ion for use in this process and apparatus is an aqueous solution of sodium bromide; however, other water soluble, bromide-containing compounds can be used. Such compounds include alkali metal bromides, alkaline earth bromides, and hydrogen bromide (HBr).

The preferred source for generating the hypochlorous acid is chlorine gas, which reacts with water almost instantaneously to form the desired hypochlorous acid. Alternately, hypochlorous acid may be formed by acidification of a sodium hypochlorite solution (i.e., a bleach solution) in cases where it is desired not to store or use chlorine gas.

Based on the data from experimental runs made in an OXYCHLOR II™ generator, which data is presented below, certain process parameters are critical in producing high yields of hypobromous acid. Among these are concentration of chlorine when using concentrated aqueous sodium bromide solutions, pH of the generator effluent, and the bromide/chlorine (Br/Cl) mole ratio.

The concentration of chlorine (grams per liter) when mixed with a concentrated bromide solution, appears to be critical to the yields obtained in the above-described generator. For example, when a small (3.2 gallons per minute) nozzle was used in the water ejector system of the OXYCHLOR II™ generator, the yields of hypobromous acid were only in the 65% range. However, by simply increasing the ejector size to give a flow of 5.2 gallons per minute water, with all other conditions being the same, the yield of hypobromous acid was increased to substantially 100%. This would equate to the requirement that the chlorine concentration be below 3 grams per liter when feeding a 40% sodium bromide solution to attain high yields of hypobromous acid.

The pH of the solution in which the hypobromous acid is being generated is also an important variable. Results have shown that a pH range of about 2.3 to 2.8 will, in general, give the highest yields of hypobromous acid from the generator when the bromide/chlorine mole ratio is near 1.0 or less.

The bromide/chlorine mole ratio is also important. At pH values above about 3.0 it has been observed that as this mole ratio approaches an optimum value of 1.5 or greater, the yield of hypobromous acid approaches 100%.

The chemistry of this process is not simple and there are side reactions which can be important in the efficiency of the hypobromous acid generation. For example, it was observed during the experimental runs that rather pronounced reddish-brown solutions resulted when the generator was operated at pH values above about 2.8. As the pH was decreased to below about 2.8 and approached 2.3, the color of the solution decreased markedly and approached a pale yellow color. The main reactions believed to occur in this generator are reactions (1) and (2) discussed previously.

Reaction (3), shown below, can produce some free bromine since, under the conditions of generator operation, free chlorine can occur in the water solution below pH 4.0 and can lead to the formation of free bromine.

$$Cl_2 + 2Br^- \rightarrow Br_2 + 2Cl^- \quad (3)$$

In turn, the free bromine can react with water to slowly form hypobromous acid according to the following equation:

$$Br_2 + H_2O \rightarrow HOBr + HBr$$

This reaction is rather slow when compared to the reaction rate of chlorine with water. The equilibrium constant for the above reaction is $5.8 \times 10^{-9}$ at 25° C.

Also, the co-product hydrogen bromide (HBr) can react with hypochlorous acid to give additional hypobromous acid as shown in Reaction (4).

$$2HBr + Cl_2 + 2H_2O \rightarrow 2HOBr + 2HCl \quad (4)$$

Thus, through various side reactions, the apparent yield of hypobromous acid could appear to be over 100%.

Reaction of free bromine ($Br_2$) with a bromide ion ($Br^-$) can form a perbromide ion ($Br_3^-$) by the following reaction:

$$Br^- + Br_2 \rightarrow Br_3^-$$

This complex ion has a deep red color. However, in the presence of excess hypochlorous acid, it probably reacts to give hypobromous acid and bromine, explaining the disappearance of the reddish-brown color. Another reason for the disappearance of the reddish-brown color is the fact that free bromine can react with hypochlorous acid by the following reaction:

$$Br_2 + 5HOCl + H_2O \rightarrow 2HBrO_3 + 5HCl$$

The following examples will illustrate the invention but not limit the scope of the invention.

EXAMPLES 1–11

These experiments were run in a generator manufactured by International Dioxcide, Inc. without modification of the generator. In these experiments a 25% by weight aqueous solution of sodium bromide was fed through the sodium chlorite rotameter and the chlorine gas was fed through its regular feed line and the rotameter. The pH probe was standardized at pH 4.0 and 10.0 with standard buffer solution.

The total oxidant concentration was measured by the standard potassium iodide—thiosulfate method using a 10 ml. sample from the generator. The results are reported as ml. of thiosulfate used to react with the liberated iodine. These figures were then used to calculate the hypobromous acid content from the generator, not correcting for side reactions or excess hypochlorous acid. The ppm of hypobromous acid of by material balance has been calculated by assuming that the lowest number of moles of chlorine or sodium bromide fed to the generator gave 100% conversion to hypobromous acid. Because of the color changes observed during the various experiments, absorbance at 390 nanometers was measured.

The data gathered in these experiments is shown in Table I.

EXAMPLES 12–21

These experiments were carried out exactly as indicated in Examples 1–11 except that a 20% by weight aqueous solution of sodium bromide was used instead of the 25% solution. The results of these runs are given in Table II.

EXAMPLES 22–39

These experiments were carried out exactly as indicated in Examples 1–11 except that a 40% by weight aqueous solution of sodium bromide was used and a #13 (3.2 gallons per minute) or a #15 (5.2 gallons per minute) nozzle was used in the experiments. The results of these runs are given in Table III.

Figure 2:
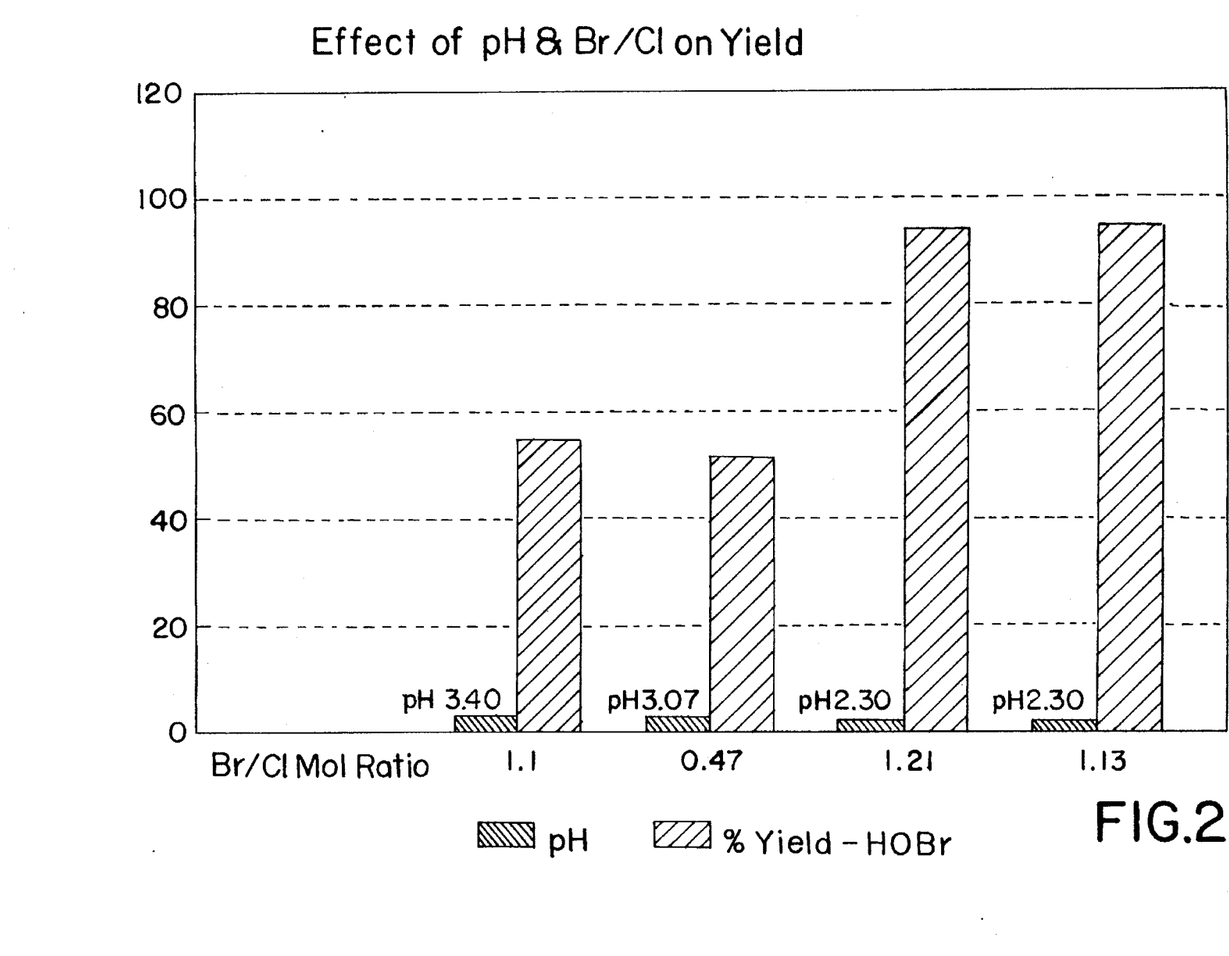
FIGS. 2–3 are bar charts to show the effect of pH & Br/Cl on yield.
Figure 3:
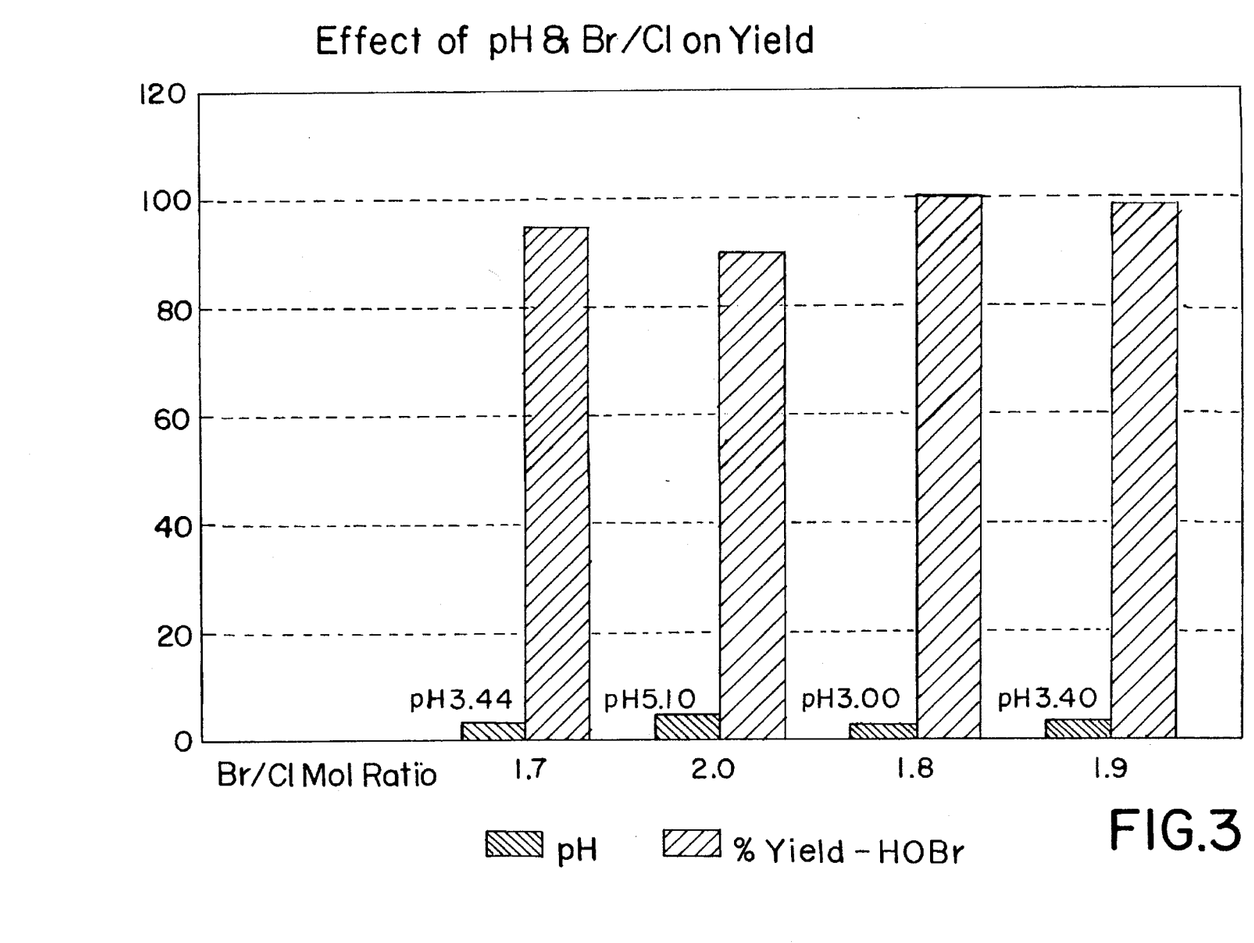
Figure 4:
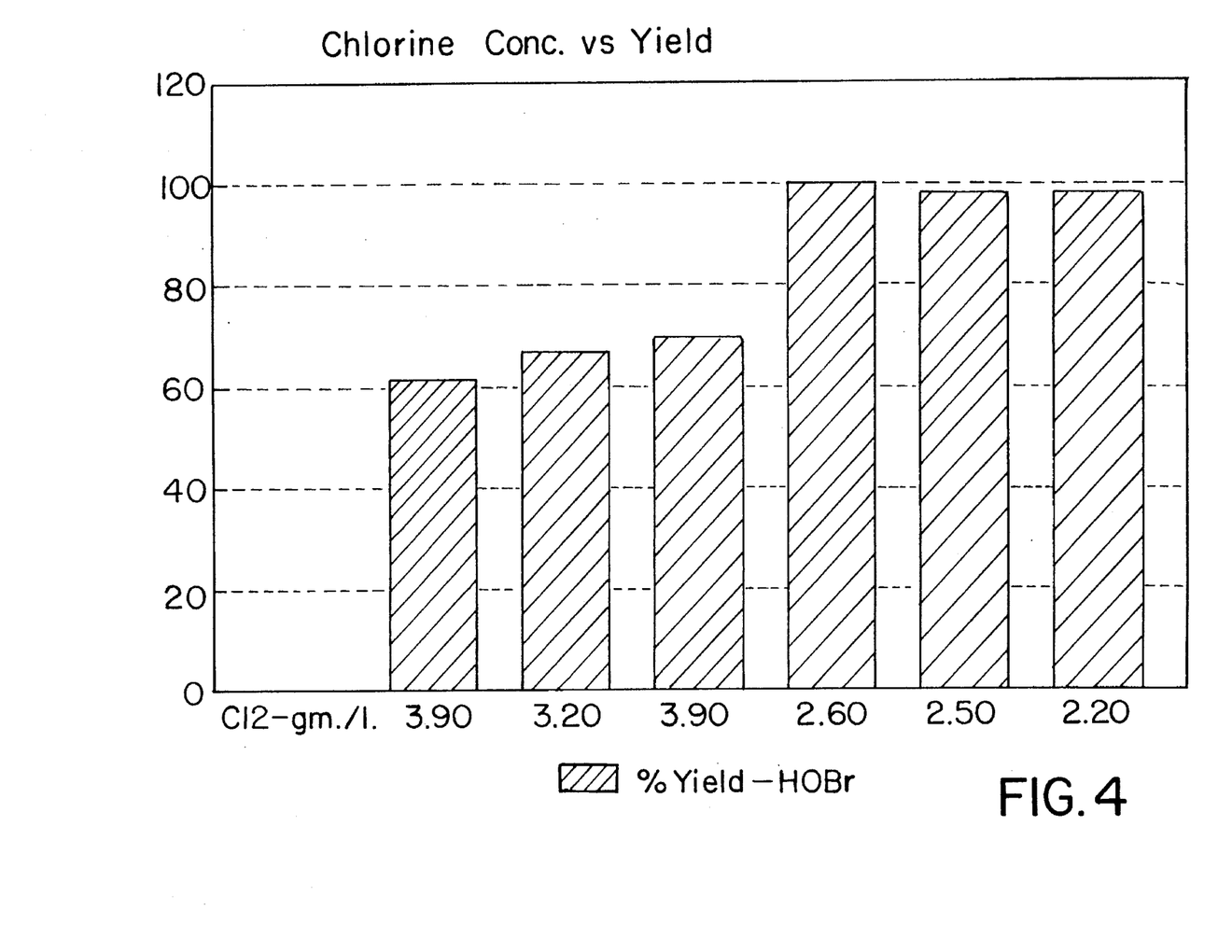
FIG. 4 is a bar chart to show the chlorine concentration versus yield.

Analysis of these results have been plotted in FIGS. 2–4. The results indicate that when the bromide to chlorine mole ratios approach 1.0, a pH in the range of 2.3– 2.8 is necessary to get high conversions of sodium bromide to hypobromous acid. They also indicate that a bromide to chlorine mole ratio of 1.5 tends to give higher conversions to hypobromous acid, other conditions such as pH being constant. Thirdly, they show that there is a critical concentration of chlorine—that chlorine concentrations above about 3.0 grams per liter reduced the yield of hypobromous acid when concentrated sodium bromide solutions (40% by weight) were fed.

EXAMPLE 40

An Oxychlor III™ generator manufactured by International Dioxide, Inc. is used in this experiment. The major difference between this reaction and the reaction carried out in the Oxychlor II™ generator used in Examples 1– 39 is that the chlorine is generated by reacting hydrochloric acid and sodium hypochlorite (bleach). Two separate streams of hydrochloric acid and bleach are mixed prior to entering the #15 eductor and then mixing with the water. The sodium bromide rotameter is set at 30 to give a flow of 138.2 lbs./day of pure sodium bromide. The sodium hypochlorite rotameter is set to deliver 63 lbs/day of pure sodium hypochlorite (504 lbs/day of 12.5 wt % commercial bleach). The hydrochloric acid rotameter is adjusted to give the solution in the generator a pH of about 3.0. The water exiting the generator should contain about 775 ppm of hypobromous acid, which is substantially 100% yield based on the bleach fed to the generator.

EXAMPLE 41

An Oxychlor II™ generator equipped with a #15 nozzle is modified to allow the water to be chlorinated first and a concentrated 40% sodium bromide solution is pumped into the water stream downstream from the chlorinator. The chlorinator rotameter is set for about 60 lbs. of chlorine gas per day. The chemical feed pump is set to deliver 138 lbs. per day of pure sodium bromide. After sufficient time is elapsed to allow for equilibrium, a sample should be taken from the generator and analyzed for hypobromous acid content. The yield of hypobromous acid should be 98%.

EXAMPLE 42

An Oxychlor II™ unit is repiped to allow the pure chlorine gas and a 40% sodium bromide solution to prereact before dilution with water in the eductor system. Although some hypobromous acid should be produced immediately upon start-up, the solution will be considerably redder in color than when the components are fed separately into the eductor and thus diluted while reacting. The red color is probably due to the following reactions:

$$Cl_2 + NaBr \rightarrow Br_2(red) + NaCl$$

$$Br_2 + Br^- \rightarrow Br_3^- (red)$$

While the invention has been described with preferred embodiments, it is to be understood that variations and modifications may be resorted to as will be apparent to those skilled in the art. Such variations and modifications are to be considered within the purview and the scope of the claims appended hereto.

TABLE I

HYPOBROMOUS ACID RUNS AT 25 WT. % AQEUOUS SODIUM BROMIDE

| Ex. # | Cl2 lbs/day | 25% NaBr lbs/hr | NaBr (pure) lbs/day | NaBr lb-moles/day | Cl2 lb-moles/day | pH | Dilution With Water Before Measurement of Absorption at 390 nm | Absorption 390 nm | ml Thiosulfate (10 ml Sample) | ppm HOBr (Analytical) | ppm HOBr (Material Balance) | Theoretical HOBr lbs/day | HOBr % Yield |
|---|---|---|---|---|---|---|---|---|---|---|---|---|---|
| 1 | 28 | 0 | 0 | 0 | 0.39 | 3.17 | 0 | 0 | 0.50 | 170 (Cl2) | — | 0 | — |
| 2 | 35 | 4.0 | 24.0 | 0.23 | 0.49 | 3.07 | 0 | 0.249 | 0.90 | 429 | 835 | 22.6 | 51.3 |
| 3 | 50 | 14.0 | 84.0 | 0.82 | 0.70 | 3.36 | 1/1 | 0.813 | 2.90 | 1384 | 2528 | 68.3 | 54.9 |
| 4 | 60 | 20.6 | 123.6 | 1.20 | 0.84 | 4.04 | 1/5 | 0.500 | 3.95 | 1885 | 3012 | 81.4 | 62.6 |
| 5 | Low | 0 | 0 | 0 | Low | 2.90 | — | — | 0.85 | 290 (Cl2) | — | 0 | — |
| 6 | 40 | 16.0 | 96.0 | 0.93 | 0.56 | 2.75 | 1/10 | 0.089 | 2.45 | 1169 | 1188 | 54.2 | 98.4 |
| 7 | 48 | 16.0 | 96.0 | 0.93 | 0.67 | 5.03 | 1/10 | 0.098 | 1.67 | 797 | 1422 | 64.9 | 56.0 |
| 8 | 55 | 16.0 | 96.0 | 0.93 | 0.77 | 2.30 | 1/10 | 0.007 | 3.25 | 1551 | 1645 | 75.1 | 94.2 |
| 9 | —N.R. | 27.5 | 165.0 | 1.60 | — | 2.60 | 1/10 | 0.131 | 3.85 | 1838 | 1825 | (83.3) | 100.7 |
| 10 | —N.R. | 37.4 | 224.4 | 2.18 | — | 2.60 | 1/10 | 0.201 | 4.90 | 2338 | 2338 | (106.7) | 100.0 |
| 11 | 100 | 27.5 | 165.0 | 1.60 | 1.41 | 2.30 | 1/10 | 0.043 | 5.91 | 2821 | 2993 | 136.6 | 94.2 |

Experiments 1–4 - Oxychlor Basic w/pH Meter; 2.25 Gal/Min #16 Nozzle; 150 PPD Small Rotameter
Experiments 5–11 Oxychlor II w/pH meter; Gal/Min #13 Nozzle; Large Rotameter
N.R. means not reported

TABLE II

HYPOBROMOUS ACID RUNS AT 20 WT. % SODIUM BROMIDE

| Ex. # | Cl2 lbs/day | 20% NaBr lbs/hr | NaBr (pure) lbs/day | NaBr lb-moles/day | Cl2 lb-moles/day | pH | Dilution With Water Before Measurement of Absorption at 390 nm | Absorption 390 nm | ml Thiosulfate (10 ml Sample) | ppm HOBr (Analytical) | ppm HOBr (Material Balance) | Theoretical HOBr lbs/day | Yield % HOBr |
|---|---|---|---|---|---|---|---|---|---|---|---|---|---|
| 12 | 15 | 7.2 | 34.5 | 0.33 | 0.21 | 5.16 | 0 | 0.533 | 0.83 | 395 | 472 | 20.4 | 83.6 |
| 13 | 20 | 7.2 | 34.5 | 0.33 | 0.28 | 3.45 | 0 | 0.611 | 1.00 | 477 | 631 | 27.3 | 75.6 |
| 14 | 30 | 7.2 | 34.5 | 0.33 | 0.42 | 2.45 | 0 | 0.295 | 1.66 | 792 | 751 | 32.5 | 105.0 |
| 15 | 28 | 18.0 | 86.2 | 0.84 | 0.39 | 5.59 | 1/10 | 0.116 | 1.37 | 653 | 883 | 38.2 | 63.7 |
| 16 | 32 | 18.0 | 86.2 | 0.84 | 0.45 | 3.45 | 1/10 | 0.090 | 1.69 | 806 | 1009 | 43.6 | 79.8 |
| 17 | 45 | 18.0 | 86.2 | 0.84 | 0.63 | 2.68 | 0 | 0.684 | 2.25 | 1073 | 1419 | 61.3 | 75.6 |
| 18 | 45 | 30.0 | 143.7 | 1.40 | 0.63 | 5.36 | 1/10 | 0.172 | 2.34 | 112 | 1419 | 61.3 | 78.6 |
| 19 | 55 | 30.0 | 143.7 | 1.40 | 0.77 | 3.24 | 1/10 | 0.187 | 2.93 | 1398 | 1736 | 75.0 | 80.4 |
| 20 | 75 | 30.0 | 143.7 | 1.40 | 1.06 | 2.46 | 1/10 | 0.134 | 4.42 | 2108 | 2368 | 102.3 | 89.0 |
| 21 | 15 | 30.0 | 143.7 | 1.40 | 0.20 | 6.41 | 1/10 | 0.048 | 0.88 | 419 | 448 | 19.4 | 93.5 |

Eductor = 43,200 lbs water/day

TABLE III

| | | | | | | | Dilution With Water Before Measurement of Absorption at 390 nm | Absorption 390 nm | ml Thiosulfate (10 ml Sample) | ppm HOBr (Analytical) | ppm HOBr (Material Balance) | Theoretical HOBr lbs/day | Yield % HOBr |
|---|---|---|---|---|---|---|---|---|---|---|---|---|---|
| Ex. # | Cl2/# lbs/day | 40% NaBr lbs/hr | NaBr (pure) lbs/day | NaBr lb-moles/day | Cl2 moles/day | pH | | | | | | | |

HYPOBROMOUS ACID RUNS AT 40 WT. % AQUEOUS SODIUM BROMIDE

| Ex. # | Cl2/# lbs/day | 40% NaBr lbs/hr | NaBr (pure) lbs/day | NaBr lb-moles/day | Cl2 moles/day | pH | Dilution | Absorption 390 nm | ml Thiosulfate | ppm HOBr (Analytical) | ppm HOBr (Material Balance) | Theoretical HOBr lbs/day | Yield % HOBr |
|---|---|---|---|---|---|---|---|---|---|---|---|---|---|
| #13 Nozzle | | | | | | | | | | | | | |
| 22 | 100 | 14.4 | 138.2 | 1.34 | 1.43 | 2.59 | 1/10 | 0.065 | 6.22 | 2966 | 3013 | 130.2 | 98.4 |
| 23 | 53 | 14.4 | 138.2 | 1.34 | 0.75 | 3.44 | 1/10 | 0.197 | 3.27 | 1559 | 1682 | 72.7 | 95.1 |
| 24 | 47 | 14.4 | 138.2 | 1.34 | 0.66 | 5.05 | 1/10 | 0.191 | 2.80 | 1335 | 1480 | 63.9 | 90.2 |
| 25 | 100 | 27.7 | 265.9 | 2.58 | 1.43 | 3.03 | 1/10 | 0.437 | 6.71 | 3200 | 3185 | 137.6 | 100.4 |
| 26 | 96 | 27.7 | 265.9 | 2.58 | 1.35 | 3.43 | 1/10 | 0.436 | 6.27 | 2990 | 3041 | 130.8 | 98.3 |
| 27 | 86 | 27.7 | 265.9 | 2.58 | 1.21 | 5.05 | 1/10 | 0.416 | 5.62 | 2680 | 2715 | 117.3 | 98.7 |
| 28 | 150 | 27.7 | 265.9 | 2.58 | 2.10 | 2.58 | 1/10 | 0.172 | 6.22 | 2966 | 4810 | 203.5 | 61.6 |
| 29 | 125 | 27.7 | 265.9 | 2.58 | 1.76 | 2.77 | 1/10 | 0.239 | 5.65 | 2695 | 4030 | 170.5 | 66.8 |
| 30 | 125 | 18.8 | 181.0 | 1.76 | 1.76 | 2.18 | 1/10 | 0.085 | 5.77 | 2752 | 3946 | 170.5 | 69.7 |
| 31 | 150 | 23.3 | 224.2 | 2.18 | 2.11 | 2.18 | 1/10 | 0.126 | 6.71 | 3200 | 4722 | 204.5 | 67.8 |
| #15 Nozzle | | | | | | | | | | | | | |
| 32 | 125 | 27.7 | 265.9 | 2.58 | 1.76 | 2.56 | 1/10 | 0.241 | 5.85 | 2790 | 2730 | 170.5 | 102.1 |
| 33 | 150 | 27.7 | 265.9 | 2.58 | 2.11 | 2.44 | 1/10 | 0.175 | 6.64 | 3167 | 3275 | 204.5 | 96.7 |
| 34 | 150 | 23.3 | 224.2 | 2.18 | 2.11 | 2.30 | 1/10 | 0.145 | 6.04 | 2881 | 3275 | 204.5 | 87.9 |
| #14 Nozzle | | | | | | | | | | | | | |
| 35 | 150 | 27.7 | 265.9 | 2.58 | 2.11 | 2.52 | 1/10 | 0.036 | 3.96 | 1889 | 2156 | 204.5 | 87.6 |
| 36 | 60 | 14.4 | 138.2 | 1.34 | 0.84 | 3.29 | 1/10 | 0.083 | 1.63 | 777 | 775 | 81.9 | 100.3 |
| 37 | 150 | 18.8 | 181.0 | 1.76 | 2.11 | 2.57 | 1/10 | 0.018 | 3.58 | 1707 | 1613 | 170.5 | 105.8 |
| 38 | 60 | 14.4 | 138.2 | 1.34 | 0.84 | 3.43 | 1/10 | 0.075 | 1.60 | 763 | 743 | 78.5 | 102.7 |
| 39 | 125 | 14.4 | 138.2 | 1.34 | 1.76 | 2.69 | 1/10 | 0.008 | 2.69 | 1283 | 1182 | 124.9 | 108.5 |

13 Nozzle = 3.2 gals/min or 43,200 lbs of water/day
14 Nozzle = 8.8 gal/min or 105,684 lbs water/day
15 Nozzle = 5.2 gal/min or 62,449 lbs of water/day

What is claimed is:

1. A process for preparing an aqueous solution of hypobromous acid, which comprises the steps of:
   (a) flowing a water stream through an eductor to create a vacuum;
   (b) separately and simultaneously drawing into the eductor by said vacuum and then into the water stream, via separate feed lines, (i) gaseous chlorine and (ii) an aqueous solution of an alkali metal bromide or an alkaline earth metal bromide having a concentration of at least 20% by weight of the bromide, wherein the amounts of the gaseous chlorine and the bromide are sufficient to maintain a pH of about 2 to about 6.4 in the resulting aqueous hypobromous acid solution, and with the bromide to chlorine mol ratio being between about 0.5 and 2.0;
   (c) immediately mixing and reacting the chlorine, the bromide, and the water by passage through an in-line mixer;
   (d) completing the reaction in a reaction chamber or line; and
   (e) recovering from said reaction chamber or line said aqueous solution of hypobromous acid having a pH of about 2 to about 6.4, in which the yield of hypobromous acid is at least about 51%.

2. The process of claim 1, further comprising the step of monitoring the pH of the aqueous solution of hypobromous acid formed using a pH meter provided downstream of where the reaction between the gaseous chlorine and the bromide which form the hypobromous acid occurs.

3. The process of claim 1, wherein the alkali metal bromide is sodium bromide.

4. The process of claim 3, wherein the aqueous sodium bromide feed solution has a concentration of about 40% by weight or greater and wherein the amount of gaseous chlorine in the water stream is no greater than 3000 milligrams per liter.

5. The process of claim 3, wherein the bromide to chlorine mole ratio is less than about 1.5 to 1 and the pH is about 2.3 to 2.8.

6. The process of claim 3, wherein the ratio of bromide to chlorine is above about 1.5 and the pH is above about 3.

7. The process of claim 2, further comprising the step of purging the eductor with water after the chlorine, the bromide, and the water react to form the aqueous solution of the hypobromous acid.

8. The product prepared by the process of claim 3, wherein the hypobromous acid solution has a concentration of about 750–3000 ppm of hypobromous acid.

9. The process of claim 1, wherein the pH is about 3 and wherein the bromide/chlorine mole ratio is about 1.5 or greater.

10. The process of claim 1, wherein the bromide/chlorine mole ratio is about 1 or less and wherein the pH is between about 2.3 and 2.8.

11. The process of claim 9, wherein the alkali metal bromide is sodium bromide.

12. The process of claim 11, wherein the sodium bromide concentration is about 20 to about 40% by weight.

13. The process of claim 11, wherein the aqueous sodium bromide feed concentration is about 40% by weight and the amount of gaseous chlorine in the water stream is below about 3000 milligrams per liter.

14. The process of claim 1, wherein the mixer is a static mixer.

15. The process of claim 1, wherein the aqueous bromide solution has a concentration of about 40% by weight and the chlorine concentration in the water stream is below about 3 grams per liter.

16. The process of claim 15, wherein the chlorine concentration is 2.6 grams per liter or less and wherein the yield of hypobromous acid is about 98–100%.

17. A process for preparing an aqueous solution of hypobromous acid, which comprises the steps of:

(a) flowing a water stream through an eductor to create a vacuum;

(b) separately and simultaneously drawing into the eductor by said vacuum and then into the water stream, via separate feed lines, (i) an aqueous mixture of an alkali metal hypochlorite and an acid which react to produce hypochlorous acid and (ii) an aqueous solution of an alkali metal bromide or an alkaline earth metal bromide having a bromide concentration of at least 20% by weight, wherein the hypochlorite, the acid, and the bromide are fed in amounts sufficient to maintain a pH of about 2 to about 6.4 in the resulting aqueous hypobromous acid solution;

(c) immediately mixing and reacting the hypochlorous acid, the bromide, and the water by passage through an in-line mixer;

(d) completing the reaction in a reaction chamber or line; and (e) recovering from said reaction chamber or line said aqueous solution of hypobromous acid having a pH of about 2 to about 6.4, in which the yield of hypobromous acid is at least about 51%.

18. The process of claim 17, wherein the alkali metal hypochlorite is sodium hypochlorite, the acid is hydrochloric acid, and the alkali metal bromide is sodium bromide.

19. The process of claim 18, wherein the sodium bromide is an aqueous solution having concentration of at least about 40%, by weight, or greater.

* * * * *

UNITED STATES PATENT AND TRADEMARK OFFICE
CERTIFICATE OF CORRECTION

PATENT NO. : 5,516,501
DATED : May 14, 1996
INVENTOR(S) : Joseph M. Kelley It is certified that error appears in the above-identified patent and that said Letters Patent is hereby corrected as shown below:

<u>Column 13,</u>
Line 14, Step (b), section (ii) "having a bromide concentration of at least 20% by" should read -- having a concentration of at least 20% by --

Signed and Sealed this

Sixteenth Day of March, 2004

JON W. DUDAS
*Acting Director of the United States Patent and Trademark Office*